(12) United States Patent
Jover

(10) Patent No.: US 9,288,007 B2
(45) Date of Patent: Mar. 15, 2016

(54) ENDPOINT DEVICE ANTENNA BEAM FORMING BASED JAMMING DETECTION AND MITIGATION

(71) Applicant: AT&T Intellectual Property I, L.P., Atlanta, GA (US)

(72) Inventor: Roger Piqueras Jover, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 50 days.

(21) Appl. No.: 14/081,944

(22) Filed: Nov. 15, 2013

(65) Prior Publication Data

US 2015/0141026 A1    May 21, 2015

(51) Int. Cl.
*H04K 3/00* (2006.01)
*H04W 16/28* (2009.01)
*H01Q 3/26* (2006.01)

(52) U.S. Cl.
CPC ............. *H04K 3/224* (2013.01); *H04K 3/222* (2013.01); *H04K 3/228* (2013.01); *H04W 16/28* (2013.01); *H01Q 3/2605* (2013.01); *H01Q 3/2611* (2013.01); *H04K 2203/16* (2013.01); *H04K 2203/32* (2013.01); *H04K 2203/36* (2013.01)

(58) Field of Classification Search
None
See application file for complete search history.

(56) References Cited

U.S. PATENT DOCUMENTS

| | | | |
|---|---|---|---|
| 4,388,723 A | 6/1983 | Keen | |
| 4,969,211 A | 11/1990 | Raymond | |
| 5,107,273 A | 4/1992 | Roberts | |
| 5,117,505 A | 5/1992 | Talwar | |
| 5,317,322 A | 5/1994 | Grobert | |
| 6,229,998 B1 | 5/2001 | Hamdy et al. | |
| 6,259,419 B1 | 7/2001 | Monte | |
| 6,415,131 B1 | 7/2002 | Shohara | |
| 6,486,828 B1 * | 11/2002 | Cahn et al. | 342/363 |
| 6,704,557 B1 | 3/2004 | Krishnamurthy et al. | |
| 6,771,220 B1 * | 8/2004 | Ashe et al. | 342/417 |
| 6,864,837 B2 | 3/2005 | Runyon et al. | |
| 6,996,373 B2 | 2/2006 | Kurhila et al. | |
| 7,289,827 B2 | 10/2007 | Proctor, Jr. et al. | |
| 7,487,068 B2 * | 2/2009 | Chang | G01S 7/023 702/189 |
| 7,852,964 B2 | 12/2010 | Rajappan et al. | |
| 8,099,124 B2 | 1/2012 | Tiley | |
| 8,264,408 B2 | 9/2012 | Kainulainen et al. | |
| 8,345,790 B2 | 1/2013 | Sartori et al. | |

(Continued)

FOREIGN PATENT DOCUMENTS

CN    200950587    9/2007

OTHER PUBLICATIONS

Miller, Robert D. *Exploiting the physical layer to enhance wireless operation with cognitive radios.* Diss. Rutgers University—Graduate School—New Brunswick, 2011.

(Continued)

*Primary Examiner* — Charles Appiah
*Assistant Examiner* — Margaret G Mastrodonato

(57) ABSTRACT

A method, computer-readable storage device and apparatus for locating a source of a communication impairment are disclosed. For example, the method detects the communication impairment, performs a sweep to locate a direction of the source of the communication impairment, wherein the sweep is performed in response to the detecting the communication impairment at the endpoint device, and generates a null in the direction of the source of the communication impairment.

19 Claims, 7 Drawing Sheets

(56) References Cited

U.S. PATENT DOCUMENTS

| | | | |
|---|---|---|---|
| 2001/0020918 A1* | 9/2001 | Takai | H01Q 1/246 343/729 |
| 2003/0020646 A1* | 1/2003 | Yu | G01S 13/4409 342/17 |
| 2006/0012521 A1* | 1/2006 | Small | G01S 5/0215 342/386 |
| 2006/0181468 A1* | 8/2006 | Iguchi | H01Q 1/243 343/702 |
| 2010/0069017 A1* | 3/2010 | Yamamoto et al. | 455/68 |
| 2010/0105368 A1 | 4/2010 | Nakai | |
| 2011/0065375 A1* | 3/2011 | Bradley | 455/1 |
| 2012/0050105 A1 | 3/2012 | Wu | |
| 2013/0040682 A1 | 2/2013 | Chang et al. | |
| 2013/0082875 A1* | 4/2013 | Sorensen | 342/368 |
| 2013/0157710 A1 | 6/2013 | Nammi et al. | |
| 2013/0242761 A1 | 9/2013 | Park | |
| 2014/0206343 A1* | 7/2014 | Immendorf et al. | 455/423 |

OTHER PUBLICATIONS

SS, Balasem, S. K. Tiong, and S. P. Koh. "Beamforming Algorithms Technique by Using MVDR and LCMV." (2011).

Shetty, Kumar. "A Novel Algorithm for Uplink Interference Suppression using Smart Antennas in Mobile Communications." Chapter 4 "Smart Antenna Technology," 2004 http://etd.lib.fsu.edu/theses/available/etd-04092004-143712/unrestricted/Ch_4smartantennatechnology.pdf.

Simonite, T., "Dual Antennas Would Boost Cell-Phone Signals," *MIT Technology Review*, Aug. 12, 2010.

Amid Sani, Ardalan, Lin Zhong, and Ashutosh Sabharwal. "Directional antenna diversity for mobile devices: characterizations and solutions." Proceedings of the sixteenth annual international conference on Mobile computing and networking. ACM, 2010.

Webb, S., "IPhone 4 Meets the GripOfDeathInator," *AntennaSys Blog*, Jul. 14, 2010, AntennaSys, Inc.

Rappaport, Theodore S., et al. "Millimeter Wave Mobile Communications for 5G Cellular: It Will Work!." 1-1. Online (http://ieeexplore.ieee.org/stamp/stamp.jsp?tp=&arnumber=6515173).

Bleicher, A., "Millimeter Waves May Be the Future of 5G Phones," *IEEE Spectrum*, Jun. 13, 2013, IEEE.

Marek, S., "AT&T's Rinne: Using SON Helps Improve Throughput and Reduce Dropped Called," *Fierce Wireless Tech*, Oct. 30, 2012, http://www.fiercewireless.com/tech/story/atts-rinne-using-son-helps-improve-throughput-and-reduce-dropped-calls/2012-10-30.

\* cited by examiner

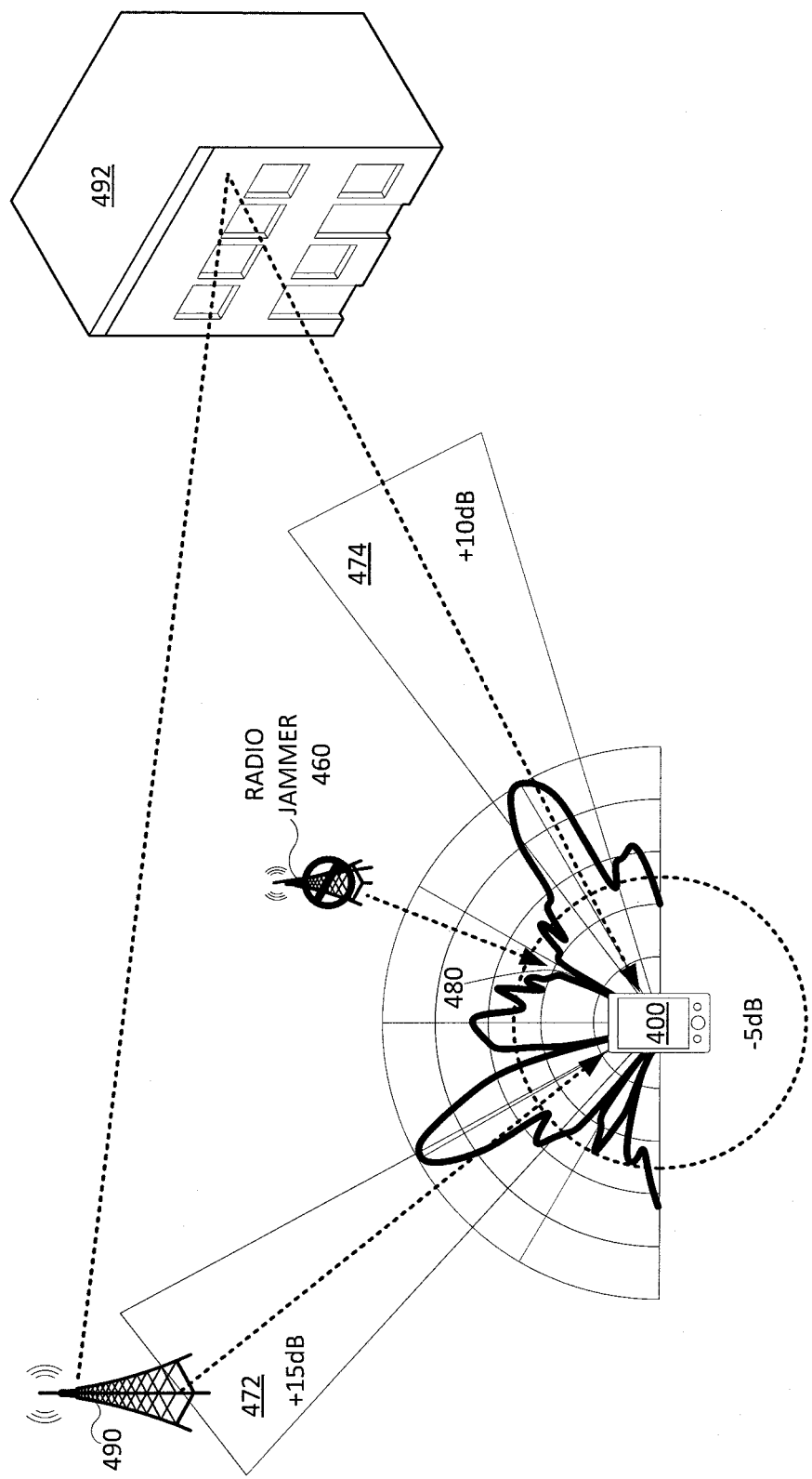

ENDPOINT DEVICE ANTENNA BEAM FORMING BASED JAMMING DETECTION AND MITIGATION

Embodiments of the present disclosure relate to detecting jamming attacks at an endpoint device and techniques to minimize the effects of such jamming attacks.

BACKGROUND

Long Term Evolution (LTE) offers enhanced capacity and coverage for current mobility networks, which experience a constant traffic increase and skyrocketing bandwidth demands. LTE is built upon a redesigned physical layer and based on an Orthogonal Frequency Division Multiple Access (OFDMA) modulation. LTE also features robust performance in challenging multipath environments and improves the performance of the wireless channel in terms of bits per second per Hertz (bps/Hz). Nevertheless, LTE remains vulnerable to radio jamming attacks.

SUMMARY

In one embodiment, the present disclosure describes a method, computer readable storage device and apparatus for locating a source of a communication impairment. For example, the method detects the communication impairment, performs a sweep to locate a direction of the source of the communication impairment, wherein the sweep is performed in response to the detecting the communication impairment at the endpoint device, and generates a null in the direction of the source of the communication impairment.

BRIEF DESCRIPTION OF THE DRAWINGS

The teaching of the present disclosure can be readily understood by considering the following detailed description in conjunction with the accompanying drawings, in which:

FIG. 4C illustrates an endpoint device while directing beams in the directions of desirable signals, according to embodiments of the present disclosure;

To facilitate understanding, identical reference numerals have been used, where possible, to designate identical elements that are common to the figures.

DETAILED DESCRIPTION

Figure 1:
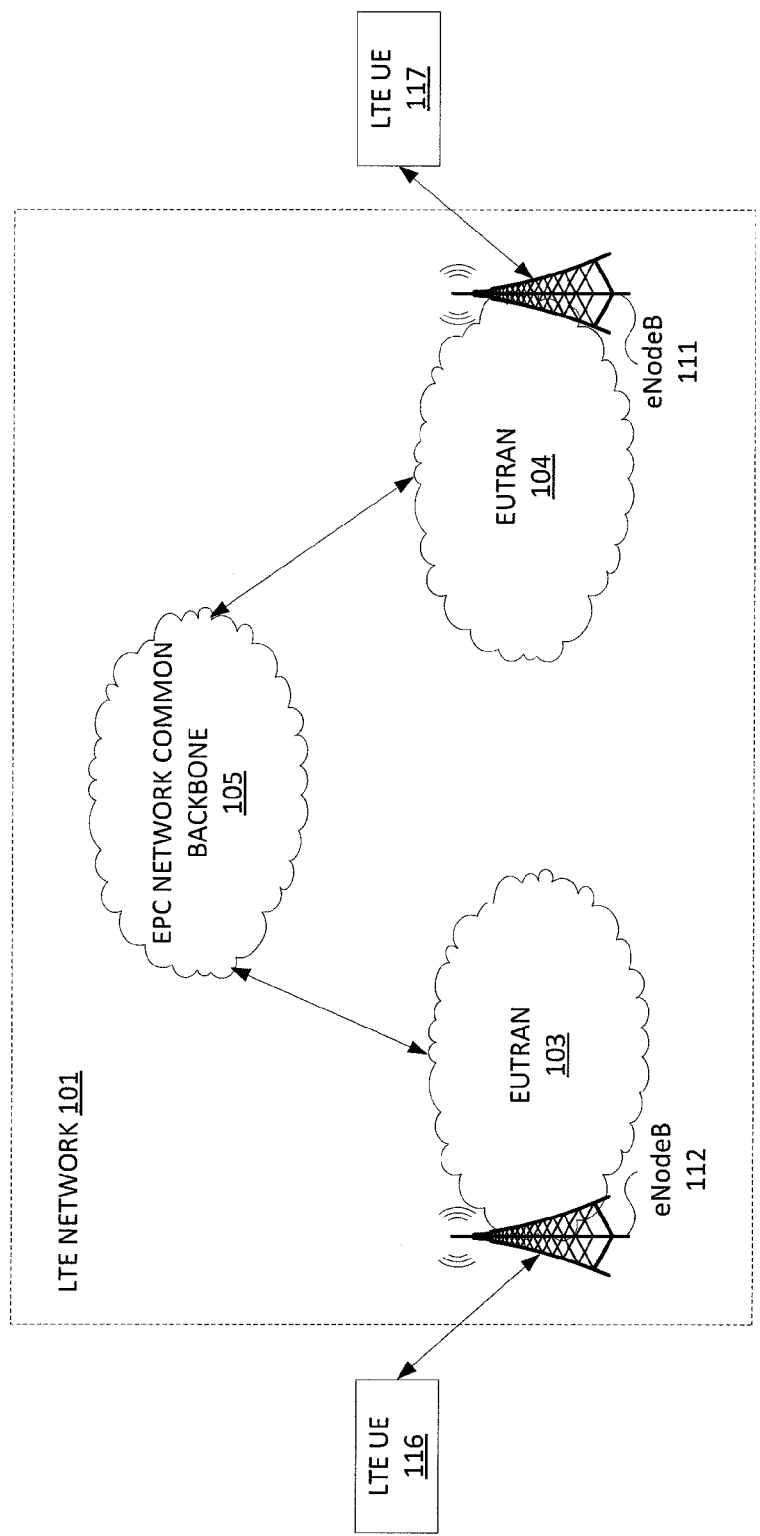
FIG. 1 illustrates an exemplary network related to the present disclosure.

The present disclosure broadly describes a method, computer-readable storage device and apparatus for locating a source of a communication impairment at an endpoint device. Although the present disclosure is discussed below in the context of exemplary LTE networks and evolved uniform terrestrial radio access networks (eUTRANs), the present disclosure is not so limited. Namely, the present disclosure can be applied to communication networks in general, e.g., general packet radio service (GPRS) networks, universal terrestrial radio access networks (UTRANs), Global System for Mobile Communications (GSM) networks, and the like, where at least one cellular access network is available.

In one embodiment, the present disclosure describes a technique for detection and mitigation of jamming attacks that affect endpoint devices of a cellular network. Jamming attacks generally involve transmitting radio signals to disrupt communications between cell sites and endpoint devices and to decrease the signal-to-noise ratio (SNR). For an LTE access network, this can cause LTE communications between the cell site and an endpoint device to fall back to GSM mode, which is less secure and allows a number of exploits to be used to intercept traffic, steal credentials, and so forth. In particular the GSM encryption is weaker than the LTE standards. In addition, a successful jamming attack on LTE communications does not necessarily need high power, and can be focused on essential LTE control channels if these are known, e.g., saturating an uplink signaling channel.

To address these issues, one embodiment provides an endpoint device having multiple antennas that can be used for beam steering as well as for null generation in desired directions. When the endpoint device detects an impairment condition, e.g., a low SNR, or some other trigger, the endpoint device may initiate a process to detect a direction/location of a source of the communication impairment. In particular, the endpoint device considers that the communication impairment is due to a jamming signal and attempts to locate the source of the jamming signal.

In one embodiment, the endpoint device may control the azimuthal angles and/or vertical tilt of the antenna radiation beam pattern to form a narrow beam and then sweep the beam such that the beam eventually covers all surface areas of an imaginary sphere surrounding the endpoint device. In one embodiment, when the strongest noise signal is detected during the sweep, the endpoint device determines that this is the likely direction and/or general location of the jamming signal. Thereafter, the endpoint device may then control the multiple antennas to form a null (e.g., an approximately 50-60 dB or greater loss) in the direction of the detected jamming signal. The null being a portion of the antenna radiation pattern where a direction correlating to the detected jamming signal is strongly attenuated. This will mitigate the interference of the jamming signal and allow communications between the endpoint device and the base station to continue, e.g., without falling back to GSM.

It should be noted that although examples are described herein relating to a jamming attack (i.e., a deliberate jamming signal) the present disclosure is equally applicable to other sources of communication impairments that are non-malicious. For example, a user-deployed femtocell or personal base station may generate sufficient interference to degrade the communication quality between an endpoint device and the network service provider base station. In one embodiment, the endpoint device also tracks its orientation and/or changes in the orientation using a gyroscope and compass or similar means. Accordingly, the endpoint device can continuously update the antenna radiation beam pattern such that the null continues to be directed and the source of the communication impairment.

In addition, in one embodiment the endpoint device may also track a direction of a desired signal and direct a beam in the direction of the desired signal. In one embodiment, the beam comprises a region of greater or greatest gain as compared to other regions of an antenna radiation beam pattern surrounding the endpoint device. For example, as mentioned above the endpoint device may control the azimuthal angles and/or vertical tilt of the antenna radiation beam pattern to form a narrow beam and then sweep the beam throughout a range surrounding the endpoint device (e.g., such that the beam eventually covers all surface areas of an imaginary sphere surrounding the endpoint device). Thus, in one embodiment, when a desired signal is detected at a greatest magnitude, a greatest SNR, a lowest BER and so forth during the sweep, the endpoint device may determine that this is a direction of a desired signal. In one embodiment, the desired signal may comprise a control channel communication from a base station. In another embodiment, the direction of the desired signal may comprise a multipath propagation from a base station that is indirectly received, e.g., by bouncing off a building, a mountain and so forth. As such, in one embodiment, the direction of the desired signal may not be a direction of an absolute greatest magnitude of a received signal strength, but instead, may be a local maximum, or one of several local maximums. In any case, in addition to generating a null in a direction of a source of a communication impairment, the endpoint device may direct a beam (a region of greater gain) in one or more directions of a source of a desired signal.

To further aid in understanding, the following provides a brief overview of common terms and technologies related to the present disclosure. Broadly defined, 3GPP is a global effort to define a wireless communication system specification. 2G refers to a second generation cellular network technology, 3G refers to a third generation cellular network technology, and 4G is a fourth generation cellular network technology. GSM is an example of a 2G cellular technology and a Universal Mobile Telecommunications System (UMTS) is an example of a 3G cellular network technology. In accordance to the 3GPP global effort, a General Packet Radio Service (GPRS) refers to a communications service used to transfer data via a cellular network. GPRS is available to users of a 2G cellular system, e.g., GSM. The GPRS provides an enhancement to the GSM system so that data packets are supported. In addition, in 3GPP release 8, LTE is provided as a set of enhancements to the UMTS. The enhancement focuses on adopting 4th Generation (4G) mobile communications technology to include an all Internet Protocol (IP) end-to-end networking architecture. LTE is an example of a 4G cellular network technology.

A base station for a 2G network is also referred to as a base transceiver station (BTS). A base station in a 3G network is also referred to as a Node B. At a particular time period, a particular base station in a 3G wireless network is controlled by a radio network controller (RNC). If at a later time period, another radio network controller is selected to control the traffic traversing through the particular base station, the particular base station is said to be re-homed to the later radio network controller. Similarly, at a particular time period, each base station in a 2G wireless network is controlled by a base station controller (BSC). For a 4G network, a radio base transceiver station (RBS), as per the 3GPP standards, is referred to as an eNodeB (or simply as a base station). An eNodeB for a 4G network provides an LTE—air interface and performs radio resource management for wireless access. It should be noted base stations in accordance with other network protocols or standards are within the scope of the present disclosure.

The radio network controllers and base station controllers route calls from user endpoint devices towards their destination via the service provider's core network. Similarly, calls destined to the user endpoint devices traverse the core network to reach a radio network controller (for 3G), a base station controller (for 2G) or an eNodeB (for 4G). As applicable, the radio network controllers, base station controllers and eNodeBs forward the calls towards their intended user endpoint device.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The exemplary base station may also be referred to as a three sector base station.

In one embodiment, e.g., in a 2G/GSM network, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized. However, in another embodiment, e.g., in a code division multiple access (CDMA) network or in an orthogonal frequency division multiple access (OFDMA) network (e.g., a 4G/LTE network), each cell and each sector may utilize all of the available frequency resources. In other words each cell and/or each sector reuses the same frequency resources.

FIG. 1 illustrates an exemplary network 100 related to the present disclosure. In one illustrative embodiment, the network 100 comprises an LTE network 101 and user endpoint devices 116 and 117.

The user endpoint devices 116 and 117 can be a smart phone, a cellular phone, a computer or laptop, a computing tablet, or any endpoint communication devices equipped with wireless capabilities.

The LTE network 101 may comprise access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. The EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In operation, LTE user equipment or user endpoint (UE) 116 may access wireless services via the eNodeB 112 located in the eUTRAN 103. Similarly, the LTE UE 117 may access wireless services via the eNodeB 111 located in the eUTRAN 104. It should be noted that any number of eNodeBs can be deployed in an eUTRAN. In one illustrative example, the eUTRANs 103 and 104 may comprise one or more eNodeBs.

The above network 100 is described to provide an illustrative environment in which embodiments of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure, for conveying communications among endpoint devices, for conveying communications between endpoint devices and other components (e.g., core network and access network components), and so forth. Those skilled in the art will realize that the communication system 100 may be expanded by including additional endpoint devices, access networks, network elements, application servers, etc., or modifying or substituting those illustrated in FIG. 1, without altering the scope of the present disclosure.

Figure 2B:
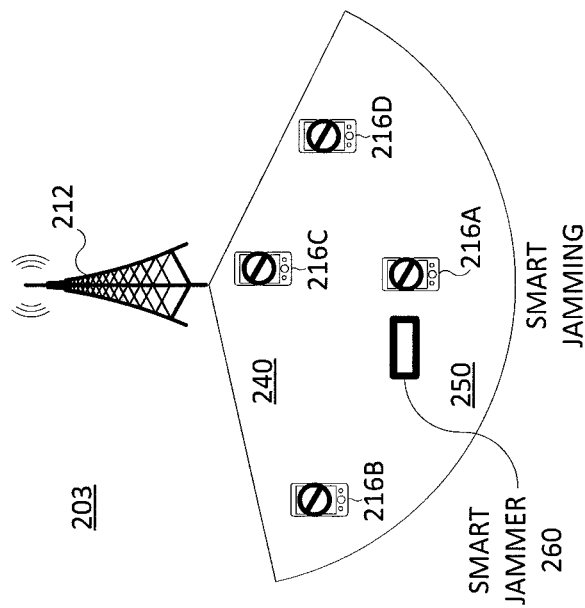
FIG. 2B illustrates and an exemplary smart jamming attack on a base station sector.
Figure 2A:
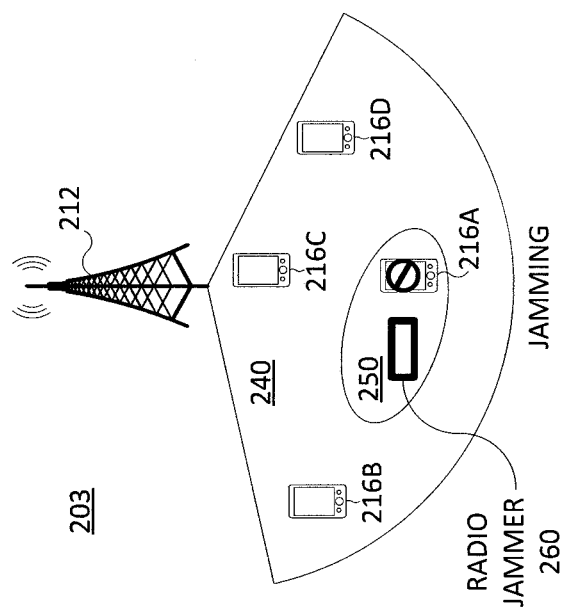
FIG. 2A illustrates an exemplary jamming attack on a base station sector.

To further aid in understanding the present disclosure, FIG. 2A illustrates a conventional jamming attack on a base station sector 240 of a cell 203. As illustrated in FIG. 2A, cell 203 comprises a base station 212 that is servicing endpoint devices 216A-216D in sector 240. In one embodiment, base station 212 comprises an eNodeB of an eUTRAN (e.g., a 4G network), or a NodeB of a UTRAN (e.g., a 3G network). As also illustrated in FIG. 2A, a radio jammer 260 is transmitting a jamming signal that covers an area 250. Notably, in a traditional jamming attack, the radio jammer transmits a jamming signal, typically random noise, over a broad range of frequencies to attempt to disrupt communication. However, to jam the entire frequency band often requires a considerable amount of power. Consequently, if radio jammer 260 comprises a typical endpoint device, such as a cellular phone, cellular-enabled laptop computer or an off-the-shelf radio jammer, the radio jammer 260 may only be capable of jamming a small area 250 surrounding the radio jammer 260. In this example, endpoint device 216A is within area 250 and thus is jammed by the signal from radio jammer 260. In one example, the jamming causes the signal-to-noise ratio (SNR), the signal-to-interference-and-noise (SINR) ratio and/or the received signal strength indication (RSSI) experienced by endpoint device 216A (and any other device in the area 250 affected by the jamming) to drop. Alternatively or in addition, the jamming may cause the bit-error rate (BER) experienced by endpoint device 216A to increase. In another embodiment, the jamming may cause a drop in traffic volume from a base station to be observed in a core network, while the base station still appears to be operational. In still another embodiment, the jamming may cause one or more of the endpoint device to fail to synchronize to the base station, or otherwise fail to establish communications with the base station. For example, the jamming attack may cause endpoint device 216A to fail to receive a primary and/or secondary synchronization signal (PSS, SSS) or to receive a corrupted PSS and/or SSS.

As a further consequence, as noted above jamming may cause 4G/LTE or 3G communications to deteriorate to the point where an endpoint device and/or base station may fall back on to 2G/GSM communications. Thus, in this example, endpoint device 216A may attempt to communicate with the base station 212 via GSM during the jamming attack. For example, the base station 212 may include components to support legacy GSM communications as a backup, or as an alternative to 3G, 4G and/or LTE. However, GSM communications are widely considered to have weak encryption standards and are subject to known exploits for base station spoofing, sniffing attacks, phishing attacks and so forth. In this regard, it should be noted that even if the base station 212 does not support 2G/GSM communication, an attacker may set up a femtocell or 2G base station (e.g., a base transceiver station (BTS)) that appears to be a legitimate base station from the perspective of the endpoint device 216A. For example the attacker may use the same device, e.g., radio jammer 260, for radio jamming as well as for providing a rouge base station. If the endpoint device 216A can be forced or tricked into connecting to the rouge base station, the attacker can then implement a number of further exploits. It should be noted that several examples herein describe attacks on 3G and/or 4G/LTE components, where 2G/GSM components comprise a backup infrastructure. Nevertheless, the present disclosure may also be applied to attacks on cellular devices and cellular network infrastructure that employ various different types of technology, including 2G/GSM infrastructure. In particular, the present disclosure relates to any cellular network suitable for use with endpoint devices having multiple antennas/directional antennas for beam steering and null generation.

FIG. 2B illustrates a more advanced jamming attack on a base station sector 240, referred to herein as "smart jamming". In particular, the cell 203, base station 212, sector 240 and endpoint devices 216A-216D may comprise the same devices and areas shown in FIG. 2A. However, in this case the radio jammer 260 illustrated in FIG. 2B comprises a smart jammer. Notably, the radio jammer 260 concentrates the jamming signal and power output over one or 2013-0734 more specific and targeted frequencies, or over a narrower range of frequencies as compared to the radio jammer 260 in FIG. 2A. Thus, in FIG. 2B, the area 250 affected by the jamming signal may include the entire range of sector 240, e.g., when the attack targets uplink signaling channels. As such, all of endpoint devices 216A-216D are affected. For example, a typical endpoint device, such as a cellular telephone or laptop computer, may be capable of jamming both uplink and downlink control channels used for 3G, 4G and/or LTE call establishment and maintenance using off-the-shelf components, or with only small upgrades or enhancements to the radio resources, e.g., an amplifier, range extender and so forth. For example, a smart jamming attack may target the physical broadcast channel (PBCH) which has assigned physical resource blocks (PRBs) which are known in advance and are always mapped to the central 72 subcarriers of the OFDMA signal. Similarly, a smart jamming attack may target the physical downlink control channel (PDCH or PDCCH), the physical uplink control channel (PUCH or PUCCH), the physical random access channel (PRACH), the primary synchronization signal (PSS), the secondary synchronization signal (SSS) and so forth.

It should be noted that LTE includes physical channels as well as logical channels, and that control channels may be physical control channels or logical control channels. The most straightforward smart jamming attack will target the physical control channels occupying defined frequencies/wavelengths. However, logical control channels may also be targeted if the attacker knows the timing of the logical control channel. For example, some of the control channels may comprise slot assignments within a master information block (MIB), e.g., on a central 72 subcarriers of the spectrum. Thus, the smart jamming may target the 72 central subcarriers with a noise signal synchronized to the timing of the particular control channel's slot assignments. However, it also remains possible for an attacker to simply target the central 72 subcarriers with a continuous noise signal.

In any case, by targeting specific channels/frequencies used for conveying signaling information for call establishment, the radio jammer 260 can effectively disrupt all communications. A successful smart jamming attack allows the attacker to utilize all of the same exploits available with regular (broadband) jamming, but affords a greater range. In addition, the cell tower itself may be affected while allowing the radio jammer 260 to be located a safe distance away, e.g., where the attacker can remain concealed or anonymous, if the attacker is using, for example, a directional antenna pointed to the eNodeB. In other words, the attacker may effectively locate the radio jammer 260 anywhere in the sector 240, while being able to affect all or most of the endpoint devices in the sector 240 as well as the equipment of base station 212 that services the sector 240.

To mitigate jamming attacks such as illustrated in FIGS. 2A and 2B, the present disclosure includes a process for an endpoint device to sweep a beam around the endpoint device, to locate a jamming source and then to direct a null in the detected direction.

Figure 3:
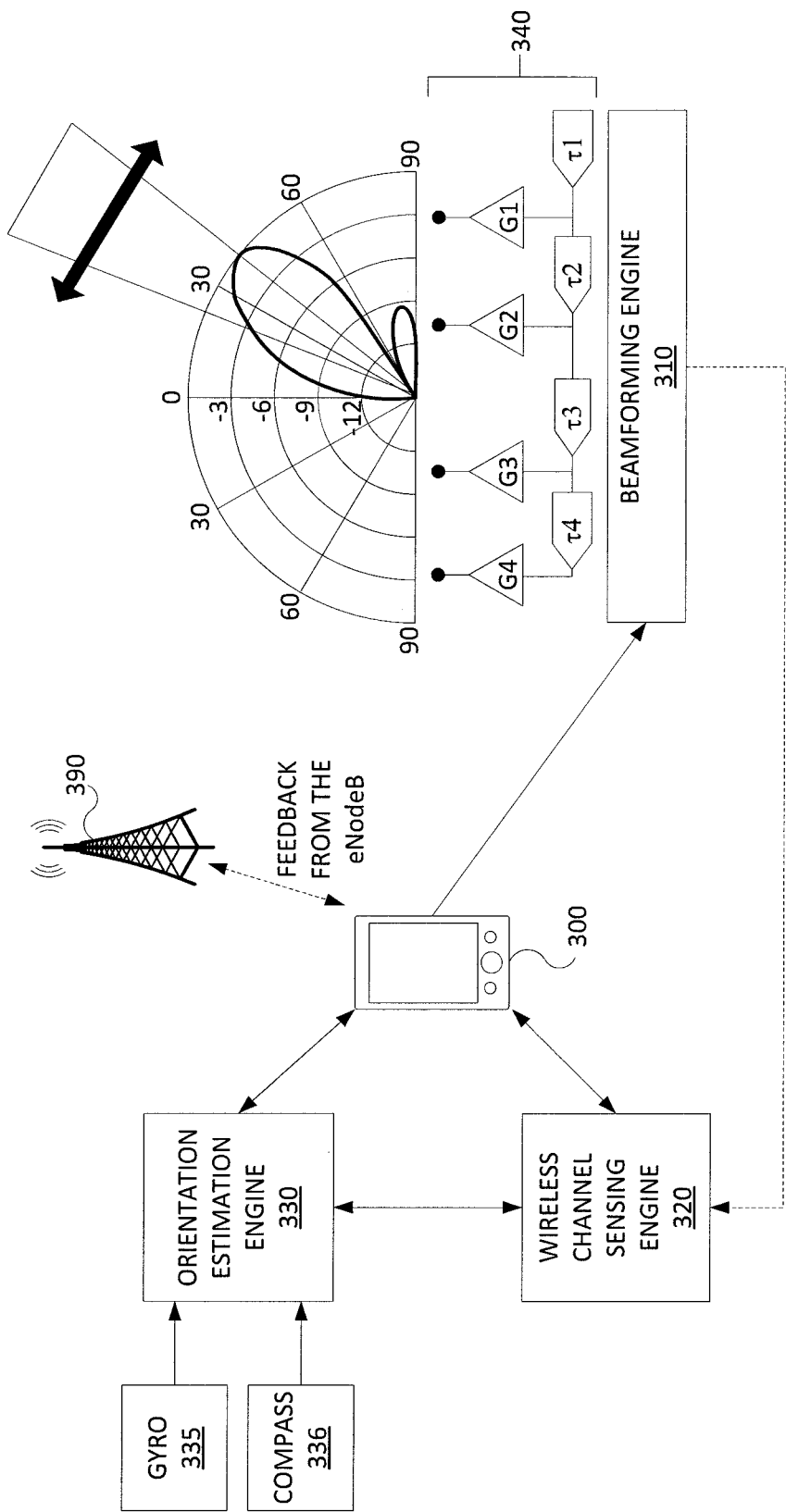
FIG. 3 illustrates an exemplary endpoint device, according to embodiments of the present disclosure.

FIG. 3 illustrates an exemplary endpoint device 300, according to the present disclosure. In one embodiment, endpoint device 300 includes a beam-forming engine 310, a wireless channel sensing engine 320, an orientation estimation engine 330 and a set of antennas 340. In one embodiment, the endpoint device 300 and any one or more of its components 310, 320, 330, etc., may comprise a computing device or system, e.g., as described below in connection with FIG. 6. The endpoint device 300 may also include a gyroscope 335 and a compass 336 for use by the orientation estimation engine 330. In one embodiment, the endpoint device 300 is also in communication with a base station 390 (e.g., an eNodeB).

In one embodiment, the beam-forming engine 310 is for controlling the gain and phase/delay of each antenna of the set of antennas 340 for beam steering and null generation. For example, when a communication impairment that may be indicative of a jamming attack is detected, the beam-forming engine 310 may generate and sweep a beam throughout all areas surrounding the endpoint device 300. For example, a communication impairment may comprise a decreased signal-to-noise ratio (SNR), decreased signal-to-interference-and-noise (SINR) ratio, decreased received signal strength indication (RSSI) and/or an increased bit-error rate (BER) detected at the endpoint device 300, a failure to connect or synchronize the endpoint device 300 with the base station 390, and so forth. In one embodiment, the communication impairment may affect one or more frequencies and/or channels, or may affect an entire range of frequencies. In response to detecting such an impairment, the beam-forming engine 310 thus creates a narrow beam (also referred to herein as radiation pattern or a gain pattern) by adjusting the gain and time delays for each antenna. The beam-forming engine 310 then steers/sweeps the beam around the endpoint device in all directions in both azimuth and elevation.

The wireless channel sensing engine 320 is for determining the SNR, SNIR, RSSI, BER, and the like as the beam-forming engine 310 sweeps a beam around an imaginary sphere surrounding the endpoint device 300. Using parameters such as the SNR, SINR, RSSI and BER, the wireless channel sensing engine 320 is able to determine the direction of the source of the communication impairment as well as the direction(s) of one or more desired signals; for example, a line-of-sight communication path with a base station, one or more multipaths to/from the base station, and so forth. In one embodiment, the wireless channel sensing engine 320 is also for detecting a communication impairment in the first instance.

For example, wireless channel sensing engine 320 may detect a threshold drop in the SNR or SINR (e.g., a 20 percent drop as compared to a preceding time period) an increase in the BER (e.g., when the BER increases beyond one percent), and so forth. In one embodiment, when the wireless channel sensing engine 320 determines that one or more of such threshold conditions are met, the wireless channel sensing engine 320 may signal to the beam-forming engine 310 to begin the beam sweeping procedure.

In one embodiment, the orientation estimation engine 330 is for determining the orientation of endpoint device 300, and for tracking changes in the orientation. For example, the orientation estimation engine 330 may use the gyroscope 335, the compass 336 and/or one of several other components to determine the orientation of the endpoint device 300 in three-dimensional space. Orientation estimation engine 330 may also use feedback from base station 390 to determine the orientation and to track changes in the orientation.

Figure 4A:
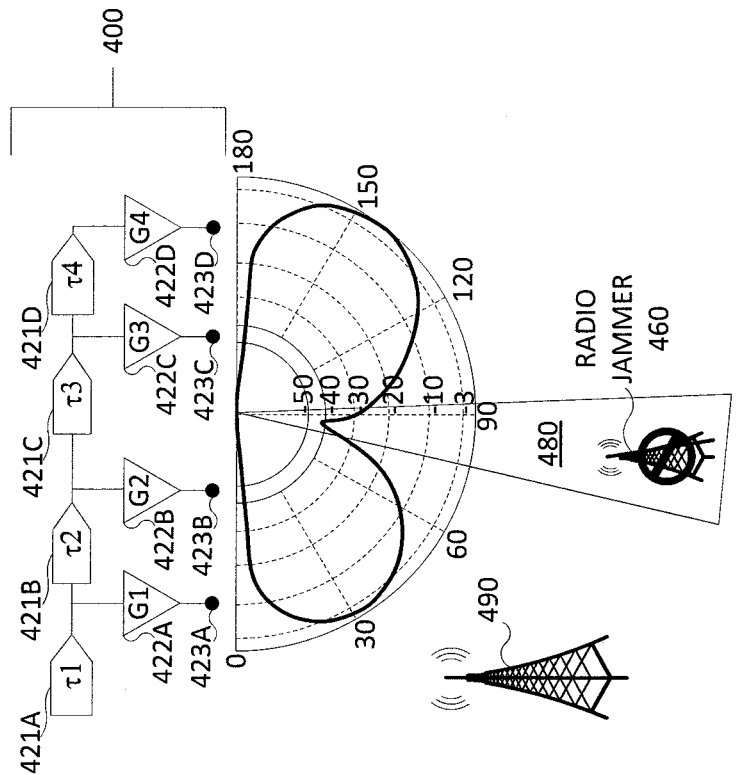
FIG. 4A illustrates an endpoint device during a sweep to detect a source of a communication impairment, according to embodiments of the present disclosure.

In accordance with the present disclosure, FIG. 4A illustrates an example of an endpoint device 400 performing a sweep to locate a source of a communication impairment. As illustrated in FIG. 4A, the endpoint device 400 includes a set of four antennas 423A-432D. However, in accordance with the present disclosure any number of antennas may be used by endpoint device 400 (e.g., two antennas, three antennas, five antennas, and so forth). Notably, the greater the number of antennas, the finer the control over the beam steering and null generation that can be achieved. In one example, the antennas 423A-423D are arranged linearly. However, other configurations, e.g., a patch antenna, a plurality of patch antennas, antennas arranged along a conical curve, and so forth are possible in accordance with the present disclosure. Each antenna 423A-423D has a corresponding gain element 422A-422D for controlling the gain of the respective antenna. In addition, delay elements 421A-421D are for introducing successive delays to the antennas 423A-423D. By controlling the gain (amplitude) and delay (phase) of copies of the signal transmitted by the antennas 423A-423D using well known techniques, the endpoint device 400 can create a directional beam 470.

It should be noted that a single set of antennas 423A-423B is illustrated in FIG. 4A. However, in other, further and different embodiments, endpoint device 400 may include multiple sets of antennas of a similar nature. For instance, if endpoint device 400 comprises a cellular telephone, or smartphone, it may include a first set of antennas situated near the back side of the device and a second set of antennas located on a front side of the device. Thus, as an example, if the user is talking with the phone near his/her ear, the set of antennas on the back side may have the best reception. Alternatively, if the user is on speakerphone, or is streaming media over the 4G/LTE network and the phone is on a tabletop, the set of antennas on the front side may have the best reception. Thus, FIG. 4A (as well as FIG. 4B) includes only a single set of antennas 423A-423D for illustrative purposes only.

An example of the gain pattern of the directional beam 470 is also shown in FIG. 4A. For example, the gain pattern shows a strong main lobe and smaller attenuated side lobes. The adjustment of gain and time delays may be used to similarly create a directional beam or gain pattern for received signals. Thus, the gain pattern shown in FIG. 4A is equally applicable to transmission signals as well as to reception signals. In addition, by adjusting the gain and delay parameters, the directional beam 470 can be steered such that all directions comprising any combination of the 360 vertical degrees and 360 horizontal degrees surrounding endpoint device 400 may be covered. However, for illustrative purposes, a two-dimensional representation is shown in FIG. 4A. By sweeping the directional beam 470 in all directions, endpoint device 400 can record the direction in which the noise is the greatest and note this direction as the direction of the source of the communication impairment/source of a jamming signal. Notably, as illustrated in FIG. 4A, a radio jammer 460 is transmitting a jamming signal/interference nearby to endpoint device 400. Thus, when the sweep of the beam 470 passes over radio jammer 460, the endpoint device 400 may determine that the greatest noise signal (and/or lowest SNR, lowest SINR, and so forth) is found, and note the direction. Once the direction of radio jammer 460 is determined, the endpoint device 400 can implement mitigation measures (e.g., directing a null at the source of the communication impairment) as described below and as illustrated in FIGS. 4B and 4C.

Figure 4B:
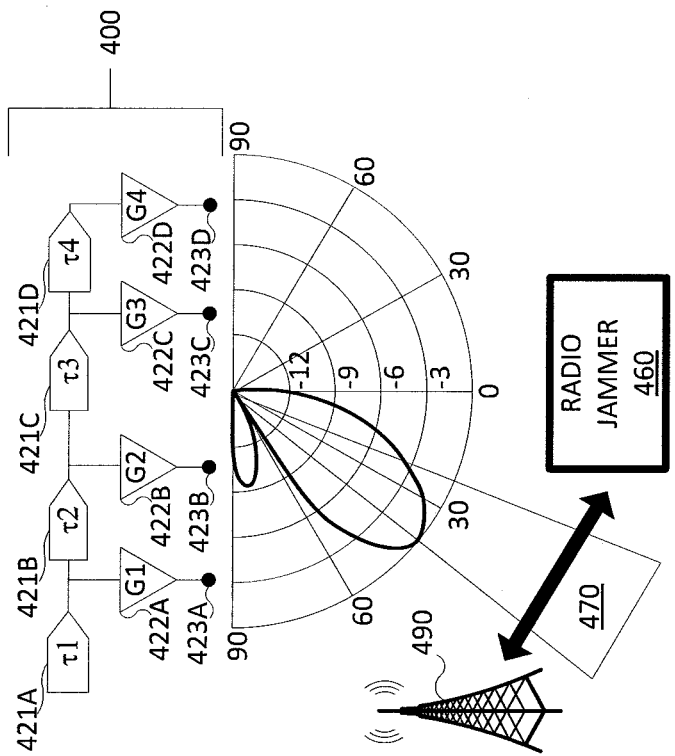
FIG. 4B illustrates an endpoint device while directing a null in the direction of a source of a communication impairment, according to embodiments of the present disclosure.

FIG. 4B illustrates endpoint device 400 directing a null 480 in the direction of radio jammer 460. Notably, the null 480 may counteract the effect of the jamming signal from radio jammer 460 experienced by endpoint device 400. In particular, the noise from the jamming signal that would affect uplink and downlink communications between the base station and endpoint device 400 is significantly reduced. However, in situations where the radio jammer 460 lies along the line-of-sight between the base station and the endpoint device 400, the endpoint device 400 may nevertheless be unable to communicate with the base station. FIG. 4B also illustrates the corresponding gain pattern for the set of antennas 423A-423D when generating the null 480. Like the creation of the beam 470 illustrated in FIG. 4A, the null 480 illustrated in FIG. 4B may be formed by controlling the delay elements 421A-421D and the gain elements 422A-422D using well known techniques to adjust the radiation pattern/gain pattern of antennas 423A-423D. However, instead of creating a narrow beam, in this case, a broad pattern is created with a significant reduction in gain (a null) in a desired direction. For example, in one embodiment the null comprises an approximately 50-60 dB attenuation in the given direction, which may be sufficient to restore the SNR and/or SINR to an acceptable level, reduce the BER, and so forth.

In one embodiment, the null 480 is generated to have as narrow a range as possible to capture the radio jammer 460 while minimizing the effects on the endpoint device 400. For example, it may be beneficial for endpoint device 400 to maintain a sufficient gain in all other directions to facilitate communication with a current serving base station as well as to facilitate discovery and handoffs to other base stations. However, the ability to scale the size, or width, of the null 480 may depend upon the number of antennas that are present in the endpoint device 400. It should also be noted that examples are described herein with respect to generating a single null, e.g., null 480. However, those skilled in the art will appreciate that multiple sources of communication impairments may be detected by sweeping a beam 470 and that multiple nulls 480 may be generated to address each of the different sources that are detected. However, as discussed above, the greater the number of antennas available to endpoint device 400, the more accurately the gain pattern can be adjusted to provide multiple nulls.

In addition to locating the source of a communication impairment, the endpoint device 400 may also locate a direction of a desired signal while performing a sweep of the beam 470. For example, as shown in FIG. 4A, endpoint device 400 may be communicating with, or attempting to communicate with base station 490. In one embodiment, while performing the sweep of beam 470, the endpoint device 400 may also take note of the RSSI, SNR, SINR and BER with respect to one or more known control channels for communicating with the base station. For example, the desired signal may comprise an LTE physical broadcast channel (PBCH), physical downlink control channel (PDCH or PDCCH), and the like.

In another embodiment, the desired signal comprises communications on a radio access bearer (RAB) that is established for an existing communication session between the endpoint device 400 and the base station 490. In any case, the endpoint device 400 may determine the direction of the base station 490 based upon the direction of the strongest received signal strength indication (RSSI) for instance, during the sweep of the directional beam 470. However, a line-of-sight communication path with base station 490 is not necessarily the only direction of a desired signal. For example, there may be one or more multipath directions from which a strong base station signal is received and detected during the sweep of the directional beam 470 illustrated in FIG. 4A. In addition, using multiple antennas, the endpoint device 400 may advantageously use any multipath signals that may be detected to enhance the reception and transmission of communications with base station 490.

To illustrate, FIG. 4C shows endpoint device 400 and a radiation beam pattern/gain pattern generated to minimize interference from the radio jammer 460 and to enhance the quality of reception in the directions of two desired signals. In particular, the endpoint device 400 generates a null 480 in the direction of the radio jammer 460, but additionally generates directional beams 472 and 474 in the direction of a line-of-sight to the base station 490 and a multipath direction where base station transmissions bounce off of a multipath source 492, e.g., a skyscraper. As illustrated in FIG. 4C, the endpoint device 400 directs a +15 dB gain in the line-of-sight direction to the base station 490 and a +10 dB gain in the direction of the multipath source 492. However, it should be noted that embodiments of the present disclosure are not limited to any specific values or any particular gain patterns such as provided in FIGS. 4A-4C. In other words, the examples of FIGS. 4A-4C are provided for illustrative purposes only. In addition, as mentioned above endpoint device 400 may include multiple sets of antennas, e.g., on the front side and the back side respectively. Thus, in one embodiment, a first directional beam may be generated by the one set of antennas while as second directional beam may be generated by the second set of antennas.

Endpoint device 400 may expend considerable power to mitigate the effects of interference, from whatever the source. For example, without the use of the present embodiments, endpoint device 400 may attempt to boost its transmission power to overcome a jamming signal. In addition, while performing a sweep to locate a source of a communication impairment in accordance with the present disclosure, the endpoint device 400 may expend considerable power to perform a full directional sweep. Thus, by also directing beams 472 and 474 in the direction(s) of one or more desired signals, the endpoint device 400 may conserve power and/or maintain battery life without sacrificing reception quality. In one embodiment, endpoint device 400 does not increase the power of transmission in the directions of beams 472 and 474, but rather reduces the gain in the other directions such that the overall power usage is reduced. However, it should be noted that in any case, the endpoint device 400 maintains a null (a region of a greatest loss, least gain) in a direction of a source of the communication impairment.

It should be noted that in one embodiment, the detection of the communication impairment may first occur at a device other than the endpoint device. For example, a base station may detect a location/direction of a source of a communication impairment. Similarly, an EPC network may detect a drop in traffic from the base station. Thus, the EPC network and/or a component thereof, may notify the base station. In turn, the base station may notify the endpoint device that a sector of the base station is potentially experiencing a jamming attack. In one embodiment, the base station may already have determined a direction and/or location of a source of the jamming signal. Thus, in one example the base station may inform endpoint devices not only of the fact that a potential attack is underway, but also of the direction/location of the most likely source.

Figure 5:
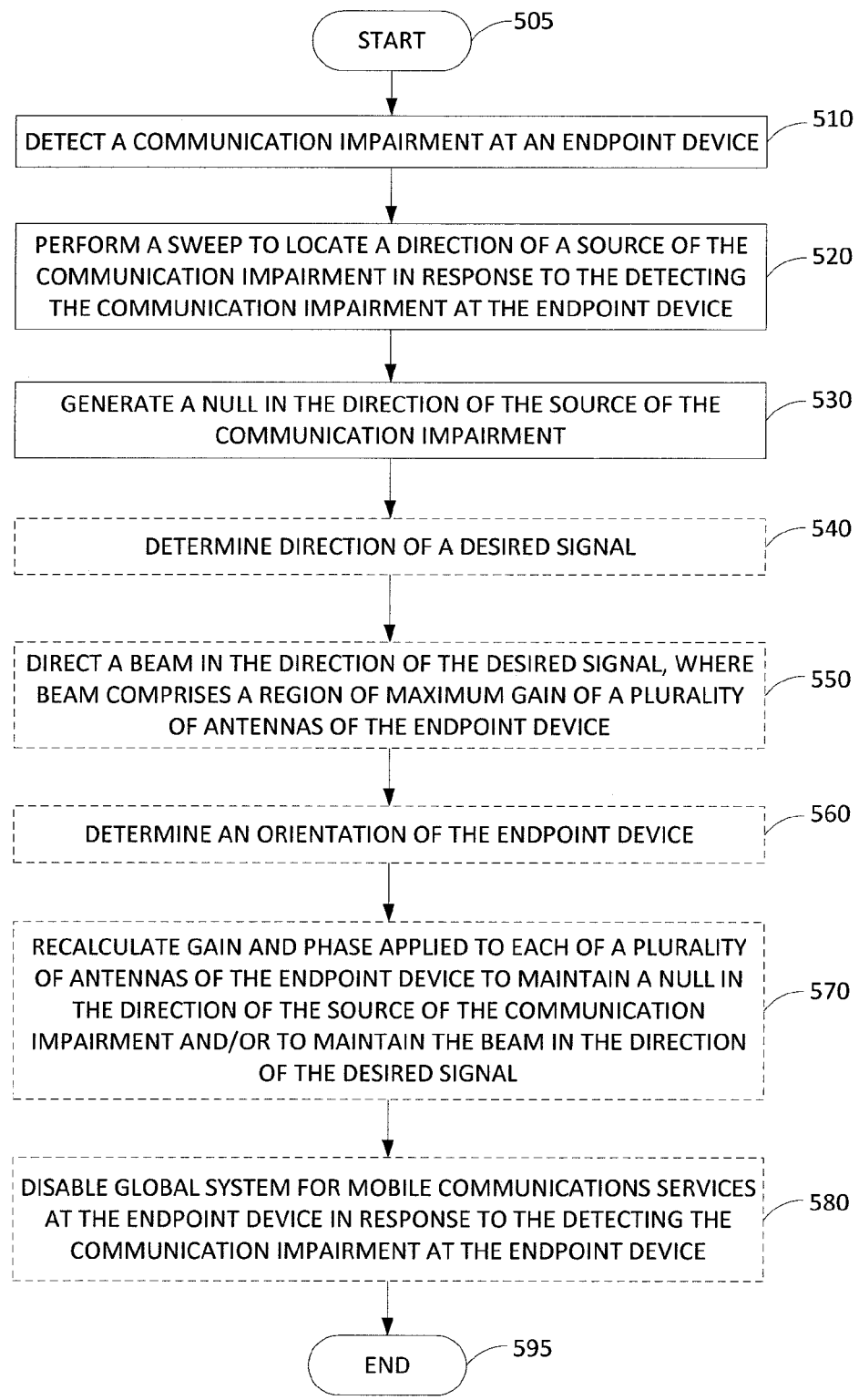
FIG. 5 illustrates a flowchart of a method for locating a source of a communication impairment at a base station, according to embodiments of the present disclosure.

FIG. 5 illustrates a flowchart of a method 500 for locating a source of a communication impairment. In one embodiment, the method 500 is performed by an endpoint device such as illustrated in any of FIGS. 1-4. Alternatively, or in addition, the steps, functions, or operations of method 500 may be performed by a computing device or system 600, and/or processor 602 as described in connection with FIG. 6 below.

Method 500 starts in step 505 and proceeds to step 510. In step 510, method 500 detects a communication impairment at an endpoint device. For example, the method may determine that there is a drop in a signal-to-noise ratio (SNR), the signal-to-interference-and-noise (SINR) ratio and/or a received signal strength indication (RSSI) experienced at the endpoint device. Alternatively or in addition, the method may determine that a bit-error rate (BER) has increased. In one embodiment, the method monitors all or a portion of the spectrum utilized for uplink and/or downlink communications. However, in another embodiment the method monitors one or more individual channels to detect the communication impairment on a particular channel. For example, the method may monitor the physical random access channel (PRACH) to observe a change in the SNR. Similarly, the method may separately monitor a plurality of other control channels in the same manner.

In still another embodiment, at step 510 the method 500 may monitor a radio access bearer (RAB) that is established for an existing communication session between the endpoint device and a base station. In addition, in one embodiment the method 500 may employ a threshold for determining whether a communication impairment is detected. For example, the method may detect a communication impairment when the SNR decreases 20 percent or greater, when the BER increases beyond one percent, when the traffic volume declines 50 percent or greater, and so forth. In still another embodiment, the communication impairment is detected as an inability of the endpoint device to establish communications with a base station, a failure to synchronize with the base station, and the like. For instance, a jamming signal may target the primary synchronization signal (PSS) and/or secondary synchronization signal (SSS) of an LTE base station/eNodeB.

At step 520, the method 500 performs a sweep to locate a direction of the source of the communication impairment that is detected at step 510. For example, the method may perform a sweep using one or more sets of antennas of the endpoint device, e.g., as described above in connection with FIG. 4A. In particular, the method may control the radiation/gain pattern for the antennas to form a directional beam and sweep the beam around an imaginary sphere surrounding the endpoint device. In other words, the method may steer/sweep the beam around the endpoint device in all directions in both azimuth and elevation. In one embodiment, the direction of the source of the communication impairment is determined to be the direction in which a lowest SNR, SINR, or RSSI is experienced. In another embodiment, the direction of the source of the communication impairment is determined to be the direction in which a greatest bit-error rate is experienced. In one embodiment, where the communication impairment is detected on a specific channel (e.g., a specific control channel), the sweep may involve monitoring channel quality measures, e.g., the SNR, SINR, RSSI, bit-error rate and the like, with respect to the specific channel. In still another embodiment, the method 500 may monitor one or more of a plurality of known control channels to monitor the channel quality measures in the absence of knowledge of which channel is being targeted by a potential attack. In one embodiment, the sweep is performed at step 520 in the same manner described above in connection with FIG. 4A.

At step 530, the method 500 generates a null in the direction of the source of the communication impairment. For example, as mentioned above, a null may be formed by controlling the delays and the gains of different antennas of the endpoint device to adjust an overall radiation pattern/gain pattern of the set of antennas and/or of the endpoint device. For instance, a wide pattern may be created with a significant reduction in gain (a null) in the direction of the source of the communication impairment. In one embodiment, the null comprises an approximately 50-60 dB attenuation in the given direction, which may be sufficient to restore the SNR, SINR, RSSI, BER and the like to acceptable level(s). In one embodiment, the generating a null at step 530 is performed as described above in connection with FIG. 4B.

At optional step 540, the method 500 determines a direction of a desired signal. For example, in addition to determining a direction of the source of the communication impairment at step 520, the method may additionally monitor the SNR, SINR, RSSI, BER for one or more desired signals during the sweep. For instance, the desired signal may comprise an LTE physical broadcast channel (PBCH), physical downlink control channel (PDCH or PDCCH), and the like. In one embodiment, the desired signal may reside on one or more known frequencies or frequency bands. In another embodiment, the desired signal comprises communications on a radio access bearer (RAB) that is established for an existing communication session between the endpoint device and the base station.

In one embodiment, the method 500 may perform a separate sweep to locate a direction of a desired signal. In other words, the method 500 may perform one sweep at step 520 and another sweep at optional step 540. In any case, the method may determine the direction of the desired signal based upon the direction of the highest/lowest channel quality measure during a beam sweep; e.g., the strongest received signal strength indication (RSSI), in one example. In one embodiment, the method 500 may determine several directions of a desired signal. For example, the method may detect a line-of-sight signal to a base station as well as one or more reflected signals from the base station which are bounced off one or more multipath sources.

At optional step 550, the method directs a beam in the direction of the desired signal determined at optional step 540. For example, the beam may comprise a region of maximum gain of a plurality of antennas of the endpoint device. In one embodiment, step 550 is performed as described above in connection with FIG. 4C.

At optional step 560, the method determines an orientation of the endpoint device. For example, the method may access a gyroscope and compass to determine an orientation of the endpoint device, e.g., in three-dimensional space. In one embodiment, the method notes the relative orientation of the endpoint device with reference to the direction/location of the source of the communication impairment determined at step 520. Alternatively, or in addition, in one embodiment the method notes the relative orientation of the endpoint device with reference to the direction/location of the source of the desired signal determined at optional step 540.

At optional step 570, the method maintains the null in the direction of the source of the communication impairment and/or maintains the beam (e.g., a region of maximum gain, or of relatively greater gain as compared to other directions) in the direction of the desired signal. For example, the method may continue to monitor compass and/or gyroscope readings to track any orientation changes of the endpoint device and/or a set of antennas of the endpoint device. In turn, the method may recalculate the gains and phases applied to each of a plurality of antennas of the endpoint device, based upon the orientation change, to maintain the null or the beam in the correct direction.

At optional step 580, the method 500 may also disable GSM services as the endpoint device in response to detecting the communication impairment. For instance, the source of the communication impairment may be a device of an attacker that is carrying out a denial-of-service attack on 3G and/or 4G/LTE services. The purpose of the attack may be to force endpoint devices down to 2G/GSM backup services in order to carry out further exploits. Thus, in one embodiment, the method may suspend GSM services of the endpoint device (which may be used as a backup to LTE services) until the communication impairment can be resolved or until a malicious attack can be ruled out as a cause of the communication impairment.

Following any of steps 530-580, the method 500 proceeds to step 595 where the method ends.

In addition, although not specifically specified, one or more steps, functions or operations of the method 500 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 5 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the example embodiments of the present disclosure.

Figure 6:
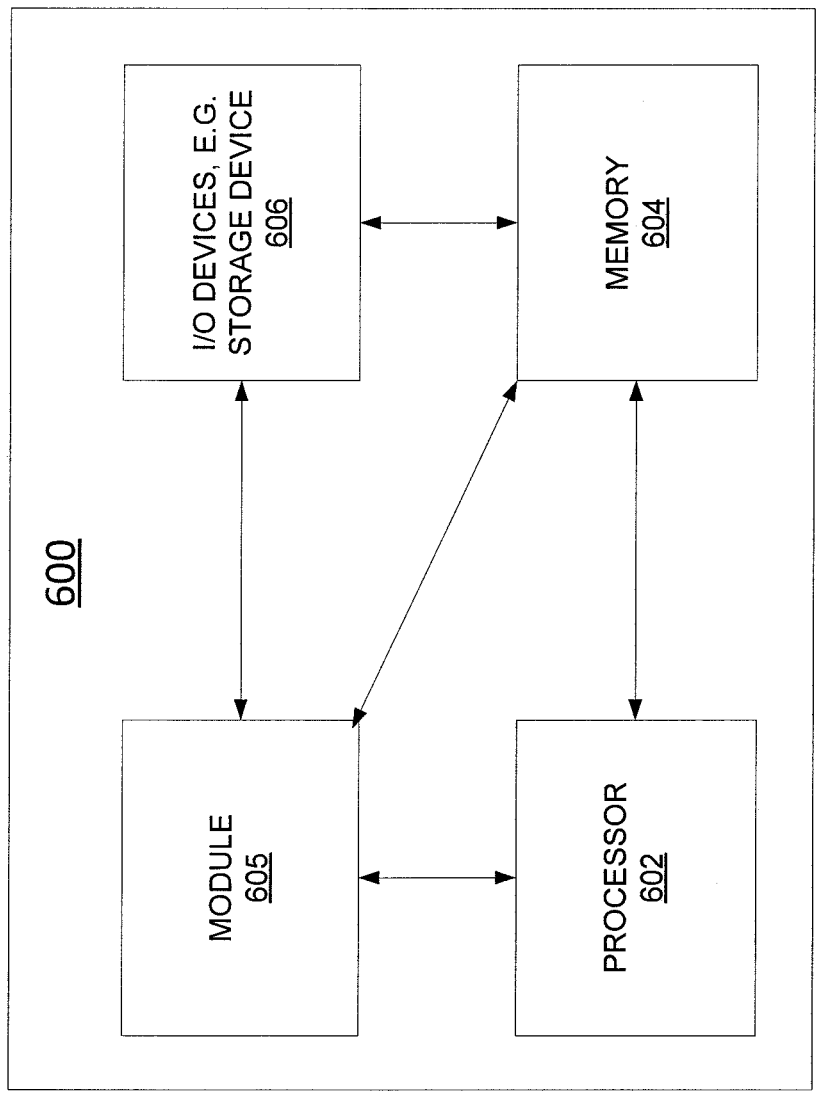
FIG. 6 illustrates a high-level block diagram of a general-purpose computer suitable for use in performing the functions, methods and algorithms described herein.

FIG. 6 depicts a high-level block diagram of a general-purpose computer suitable for use in performing the functions described herein. As depicted in FIG. 6, the system 600 comprises one or more hardware processor elements 602 (e.g., a central processing unit (CPU), a microprocessor, or a multi-core processor), a memory 604, e.g., random access memory (RAM) and/or read only memory (ROM), a module 605 for locating a source of a communication impairment, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for locating a source of a communication impairment (e.g., a software program comprising computer-executable instructions) can be loaded into memory 604 and executed by hardware processor element 602 to implement the steps, functions or operations as discussed above in connection with the exemplary method 500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for locating a source of a communication impairment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for locating a source of a communication impairment, the method comprising:
   detecting, by a processor of an endpoint device, the communication impairment;
   performing, by the processor, a sweep to locate a direction of the source of the communication impairment, wherein the sweep is performed in response to the detecting the communication impairment at the endpoint device, wherein the direction of the source of the communication impairment is determined based upon a detection of a greatest noise signal in the direction of the source of the communication impairment during the sweep;

generating, by the processor, a first null in the direction of the source of the communication impairment for a first gain pattern of a first plurality of antennas of the endpoint device; and generating, by the processor, a second null in the direction of the source of the communication impairment for a second gain pattern of a second plurality of antennas of the endpoint device.

2. The method of claim 1, wherein the communication impairment comprises a jamming signal.

3. The method of claim 1, wherein the communication impairment comprises an impairment on a long term evolution control channel.

4. The method of claim 1, wherein the communication impairment is detected as one of:
a decreased signal to noise ratio, a decreased signal to interference and noise ratio or an increased bit error rate.

5. The method of claim 1, wherein the communication impairment is detected as a failure to receive a synchronization signal from a base station.

6. The method of claim 1, wherein the sweep comprises steering a beam through a range surrounding the endpoint device.

7. The method of claim 6, wherein the steering the beam comprises adjusting a phase and a gain of each of a plurality of antennas of the endpoint device.

8. The method of claim 1, wherein the first null is generated by adjusting a phase and a gain of each of the first plurality of antennas of the endpoint device, wherein the second null is generated by adjusting a phase and a gain of each of the second plurality of antennas of the endpoint device.

9. The method of claim 1, further comprising:
disabling a global system for mobile communications service at the endpoint device in response to the detecting the communication impairment at the endpoint device.

10. The method of claim 1, further comprising:
determining an orientation of the endpoint device; and
recalculating a phase and a gain applied to each of the first plurality of antennas of the endpoint device and each of the second plurality of antennas of the endpoint device to maintain the first null in the direction of the source of the communication impairment and to maintain the second null in the direction of the source of the communication impairment.

11. The method of claim 10, wherein the orientation of the endpoint device is determined using a gyroscope and a compass of the endpoint device.

12. The method of claim 1, further comprising:
determining a direction of a first desired signal;
directing a first beam in the direction of the first desired signal, wherein the first beam comprises a region of maximum gain of the first plurality of antennas of the endpoint device;
determining a direction of a second desired signal; and
directing a second beam in the direction of the second desired signal, wherein the second beam comprises a region of maximum gain of the second plurality of antennas of the endpoint device.

13. The method of claim 12, wherein the direction of the first desired signal or the direction of the second desired signal comprises a direction of a base station.

14. The method of claim 12, wherein the direction of the first desired signal or the second desired signal comprises a direction of a multipath propagation from a base station.

15. The method of claim 12, further comprising:
determining an orientation of the endpoint device; and
recalculating a phase and a gain applied to each of the first plurality of antennas of the endpoint device and each of the second plurality of antennas of the endpoint device to maintain the first beam in the direction of the first desired signal and the second beam in the direction of the second desired signal.

16. The method of claim 1, wherein the detecting the communication impairment at the endpoint device comprises:
receiving a notification of the communication impairment from a base station.

17. A non-transitory computer-readable storage device storing instructions which, when executed by a processor of an endpoint device, cause the processor to perform operations for locating a source of a communication impairment, the operations comprising:
detecting the communication impairment;
performing a sweep to locate a direction of the source of the communication impairment, wherein the sweep is performed in response to the detecting the communication impairment at the endpoint device, wherein the direction of the source of the communication impairment is determined based upon a detection of a greatest noise signal in the direction of the source of the communication impairment during the sweep;
generating a first null in the direction of the source of the communication impairment via a plurality of antennas of the endpoint device for a first gain pattern of a first plurality of antennas of the endpoint device; and
generating a second null in the direction of the source of the communication impairment for a second gain pattern of a second plurality of antennas of the endpoint device.

18. The non-transitory computer-readable storage device of claim 17, wherein the communication impairment comprises a jamming signal.

19. An apparatus for locating a source of a communication impairment, the apparatus comprising:
a processor of an endpoint device; and
a computer-readable storage device storing instructions which, when executed by the processor, cause the processor to perform operations, the operations comprising:
detecting the communication impairment;
performing a sweep to locate a direction of the source of the communication impairment, wherein the sweep is performed in response to the detecting the communication impairment at the endpoint device, wherein the direction of the source of the communication impairment is determined based upon a detection of a greatest noise signal in the direction of the source of the communication impairment during the sweep;
generating a first null in the direction of the source of the communication impairment via a plurality of antennas of the endpoint device for a first gain pattern of a first plurality of antennas of the endpoint device; and
generating a second null in the direction of the source of the communication impairment for a second gain pattern of a second plurality of antennas of the endpoint device.

* * * * *